Patented Jan. 3, 1950

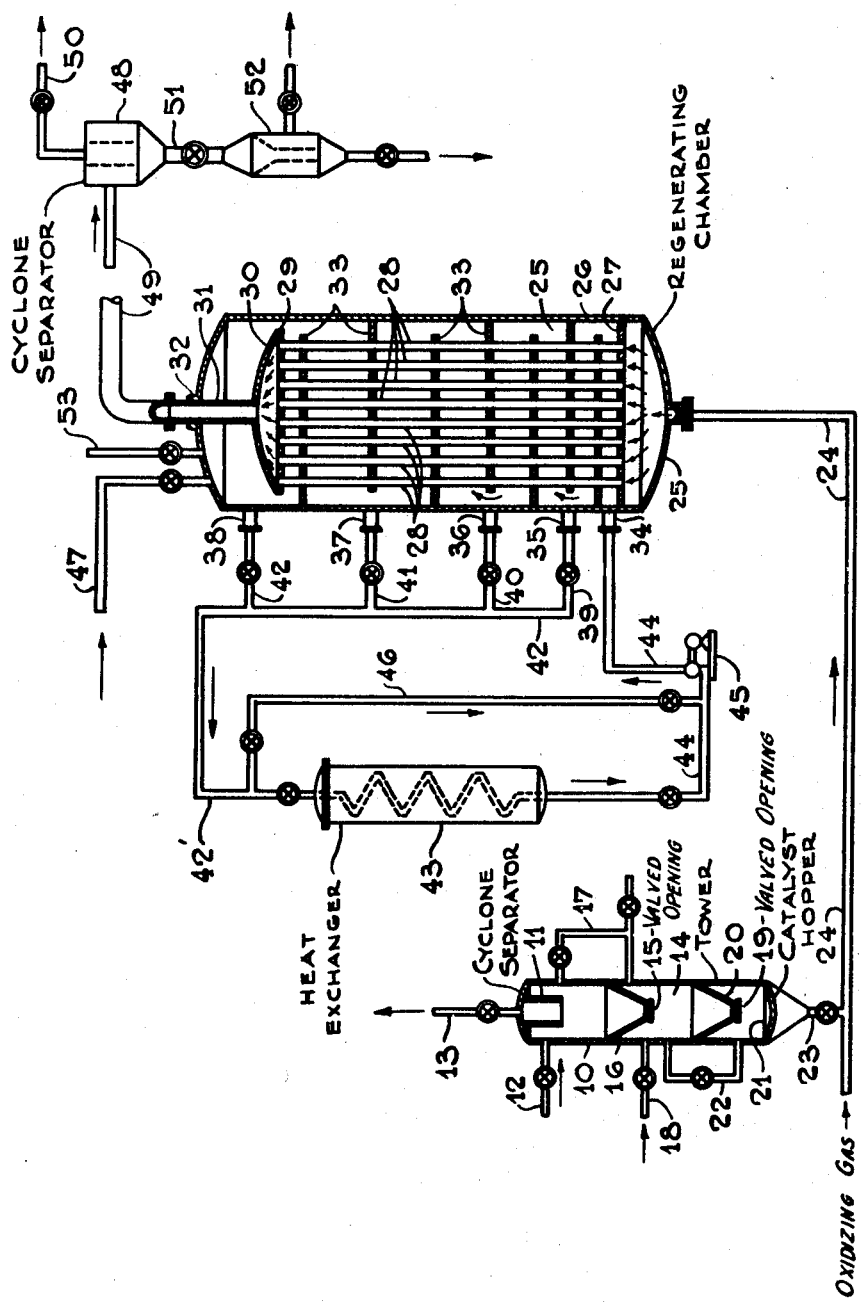

2,493,526

UNITED STATES PATENT OFFICE 2,493,526

METHOD OF CONTROLLING THE TEMPERATURE IN A FLUIDIZED CATALYST REGENERATION PROCESS

Donald L. Campbell, Short Hills, and John M. Graham, Plainfield, N. J., assignors to Standard Oil Development Company, a corporation of Delaware Original application June 29, 1940, Serial No. 343,080. Divided and this application April 18, 1944, Serial No. 531,669

2 Claims. (Cl. 252—417)

This invention relates to a method of controlling temperature and pertains more particularly to controlling reaction temperatures wherein the reactants are passed in indirect heat exchange relation with a fluid medium adapted to add or extract heat from said reactants under closely controlled temperature conditions.

While the invention in its broader phases has a more general application, as will be apparent in a more detailed description hereinafter, it finds particular application in the regeneration of powdered catalysts or other contact materials containing combustible deposits wherein the powdered material is suspended in a stream of oxidizing gas and the resulting suspension passed through a regenerating zone in heat exchange relation with a fluid cooling medium.

When regenerating many types of catalytic or other contact material it is necessary to regulate the temperature within narrow limits to avoid permanently impairing the efficiency of the material while at the same time accomplishing the regeneration within a reasonable time. For example, in the case of acid treated and other activated clays employed in the catalytic conversion and in the purifying of hydrocarbon oils the activity of the material is permanently impaired if the regenerating temperature is allowed to exceed the temperature of about 1200° F. for any substantial period of time. On the other hand the initial temperature of the combustible deposits may be of the order of 800 to 900° and to effect the rapid regeneration of the catalytic material it may be desirable to maintain the regenerating zone at a temperature of from 1000 to 1100° F. In such cases, the maximum permissible temperature spread between the minimum temperature at which the regeneration can be accomplished within a reasonable time and the maximum permissible temperature which will avoid deactivating the catalyst is at the most between 300 and 400° F. and in practical operations it is desirable to maintain the regenerating zone at a temperature closely approximating the maximum permissible temperature in order to more rapidly regenerate the catalyst.

One of the important objects of the present invention is to provide an improved method of regenerating contact material containing combustible deposits. A further object of the invention is to provide an improved heat exchanger wherein the temperature difference between the cooling medium and products to be cooled may be more effectively controlled to prevent temperature "runaways."

A further object of the present invention is to provide a method of regenerating finely divided catalytic material wherein the rate of heat removal may be more effectively controlled in accordance with changes in the rate of heat generated during the operation.

Other specific objects and advantages of the invention will be apparent from the more detailed description hereinafter in which reference will be made to the accompanying drawing illustrating a side view of an apparatus suitable for carrying out the present invention. The invention will be described as applied to the regeneration of powdered catalysts employed in the cracking of hydrocarbon oils, it being understood that in some of its phases it will have a more general application.

The amount of heat liberated during regeneration depends to some extent upon the amount of combustible deposits contained on the catalysts. Consequently as the regeneration proceeds and the amount of combustible deposits remaining on the catalyst progressively diminishes the rate of heat generation is correspondingly reduced. It is therefore unnecessary and undesirable to remove heat at the same rate throughout the full length of the regenerating zone.

If heat is removed at the same rate throughout the full length of the regenerating zone the temperature of the regenerating stream will be reduced due to the fact that liberation of heat gradually diminishes as the regeneration proceeds. In accordance with the invention the rate of heat removal is decreased as the rate of heat generation decreases so that the optimum temperature is maintained throughout the full length of the regenerating zone.

In accordance with one of the preferred embodiments of the present invention the amount of heat exchange surface per cubic foot of volume is maintained substantially uniform throughout the regenerating zone and the temperature difference causing heat transfer is progressively reduced in the direction of the flow of the catalyst. This may be accomplished by causing the heat exchange medium to flow concurrently with the catalyst and by suitably controlling the rate of flow and inlet temperature of the heat transfer medium. For example if it is desired to reduce the rate of heat transfer per cubic foot of regeneration volume gradually from a certain value at the inlet to one third of this value at the outlet it will be possible to attain this end by adjusting the rate of flow of heat transfer medium and its inlet temperature so that after the heat of regeneration is added, the outlet temperature difference to cause heat transfer is one third of the temperature difference at the inlet.

As an alternative or supplementary method of regulating the amount of heat removal, the over-all heat transfer coefficient may be varied. This may be accomplished for example by withdrawing the cooling medium at spaced points along the regenerating chamber so that the rate of flow of the cooling medium is progressively reduced. By regulating the amount of heat exchange medium withdrawn at the various points the rate of heat removal along the path of regeneration can be controlled within narrow limits. Also the velocity of the cooling or heat exchange medium may be reduced from the inlet to the outlet of the regenerating zone. This may be accomplished for example by providing transverse baffles to define the path of flow spaced at progressively increasing distances from the inlet to the outlet.

The invention also contemplates a combination of these means for regulating the temperature throughout the regeneration. For example, the reactor may be designed with progressively less heat exchange surface from the inlet to the outlet to take care of normal conditions and the heat exchange medium may be withdrawn at spaced points longitudinally thereof to accommodate unusual fluctuations.

Having set forth the general nature and objects of the invention reference will now be made to the accompanying drawing for a more detailed description thereof. Referring to the drawing the reference character 10 designates a catalyst chamber from which catalyst to be regenerated is introduced into the regenerating circuit. As illustrated, the top section of the chamber may take the form of a cyclone separator 11 for removing powdered catalyst from the cracked products from a conversion zone (not shown). The suspension of cracked vapor products and catalyst may be charged to the separator 11 through a line 12. The cracked vapors separated in the cyclone separator 11 are removed therefrom through line 13 and may be passed to suitable fractionating and purifying equipment (not shown) for segregating and purifying the desired motor fuel and other products.

Catalyst separated in the cyclone separator 11 accumulates in the upper section of the chamber and may be periodically discharged into the intermediate section 14 through a valve opening 15 in the upper partition 16. A valve by-pass line 17 is preferably provided for equalizing pressures between the upper and intermediate section during passage of the material.

The catalyst in the intermediate section 14 may be placed under the desired regenerating pressure by the introduction of steam or other inert gas through line 18. In many cases it is desirable to operate the regenerating circuit under substantial superatmospheric pressure or at a pressure level substantially higher than is maintained in the cracking circuit. The pressure during regeneration may be for example, of the order of from 3 to 10 or more atmospheres. The catalyst after being subjected to the desired regenerating pressure in the intermediate section 14 of the chamber 10 is periodically discharged through valved opening 19 in the lower partition 20 into bottom section 21 of the chamber 10. A valved by-pass line 22 may be also provided between the intermediate and lower section to equalize pressure during passage of the catalyst from the intermediate to the lower section.

The lower section 21 of the chamber 10 forms a catalyst hopper from which the catalyst is fed at a controlled rate, such as by means of a star feeder 23, into a stream of regenerating gas passing through line 24. The regenerating gas may be air or other oxidizing gas preferably having an oxygen concentration in excess of that required to burn the carbonaceous deposits from the catalyst. Catalyst removed from the cracking zone is normally at a temperature at which oxidation of the carbonaceous deposits is relatively rapid and may be for example from 800 to 950° F. so that combustion starts immediately upon introduction of the catalyst into the regenerating gas.

The suspension of catalyst and regenerating gas then passes directly through line 24 to a regenerating chamber 25. This chamber comprises an outer shell 26 forming an enclosed vessel. The chamber may be suitably insulated to reduce radiation losses. The bottom section of the chamber is provided with a tube sheet 27 which is welded or otherwise suitably secured to the outer shell.

Extending upwardly from the tube sheet 27 is a bundle of tubes 28 through which the stream of catalyst and regenerating gases pass. The upper end of the tubes terminate in a tube sheet 29 forming the bottom of a floating header 30 which communicates with a tubular conduit 31 extending through a stuffing box 32 in the upper end of the shell. By supporting the tube bundles at one point within the shell the tubes may expand and contract with temperature differences independently of the shell. If desired, guides (not shown) may be provided along the reaction chamber to maintain the tubes and shell in proper alinement.

A plurality of spaced transverse baffles 33 are provided within the shell and around the tubes to define the flow of cooling medium circulating therein. As shown, the baffles are preferably spaced at increasing distances from the lower to the upper end so that the velocity of the cooling or heat exchange medium progressively decreases from the inlet to the outlet.

The cooling medium is introduced into the shell at the lower end through port 34 and circulates around the baffles in a general direction concurrent to the flow of regenerating gas.

A plurality of longitudinal spaced ports 35, 36, 37 and 38, which are provided for removing the cooling medium from the chamber, communicate through valved branch lines 39 to 42 inclusive with a common manifold 42' which leads to a heat exchanger 43 for removing heat liberated during the reaction. The heat exchanger 43 may take a variety of forms. For example, it may comprise a waste heat boiler in which the heat is recovered in the form of steam or it may serve as a heat exchanger for preheating the oil for cracking or for preheating the air introduced into the regenerating stream. A plurality of separate heat exchange sections may be provided for recovering the heat in various ways.

The cooling fluid employed as a heat exchange medium in the regenerating chamber may be of any suitable high boiling material having the desired melting point such as for example a low melting metal or alloys or molten salts or salt mixtures.

The cooling medium after passing through the heat exchanger 43 is returned through line 44 and pump 45 to the inlet 34. If desired an inert gas such as steam may be introduced into the top of the reactor through line 47 to provide a gaseous shield above the level of the cooling fluid therein to protect the stuffing box 32. This gas may exhaust through line 53.

There may be added to the apparatus described above a storage tank (not shown) for the cooling medium interposed between branch lines 39 to 42 inclusive and heat exchanger 43. In case this is done the pump 45 is preferably located between said storage tank and heat exchanger 43.

The present invention provides a method of controlling reaction temperature wherein rapid surges in temperature are controlled without the necessity of modifying the inlet temperature of the cooling medium. The present invention does not preclude the possibility of affecting further temperature control by regulating the inlet temperature of the cooling medium. For example a portion of the cooling medium after passing through the regenerator may be by-passed around the heat exchanger 43. By regulating the relative amount of cooling medium passing through the heat exchanger 43 and through by-pass line 46 a relative rapid change in temperature of the cooling medium introduced into the reactor may be obtained.

The suspension of catalyst and regenerating gas after passing through the tubes 28 in the regenerating chamber 25 and the header 30, passes through the conduit 31 and line 49 to a suitable separator such as a cyclone separator 48 for removal of the regenerated catalyst from the regenerating gases. The regenerating gas may be rejected from the cyclone separator 48 through line 50 and may be expanded through a turbine or passed to any suitable heat recovery apparatus for removal of heat therefrom. Catalyst separated in the cyclone separator 49 may be withdrawn through duct 51 and passed to an injector 52 where it is reintroduced into oil vapors to be cracked. The resulting suspension and oil vapors may then pass to a conversion zone (not shown) wherein the oil vapors are subjected to the desired conversion treatment. The conversion products and catalyst pass through line 12 to separator 11 as previously described.

The outer shell 26 of the regenerating chamber is preferably provided with a valved vent line 53 to release inert gases introduced through line 47 to prevent building up of excessive pressures within the chamber.

This application forms a division of our earlier application Serial No. 343,080, filed June 29, 1940, now abandoned.

Having described the preferred embodiment of the invention it will be understood that it embraces such other variations and modifications as come within the spirit and scope thereof. What is desired to be protected by Letters Patent is:

1. A method of controlling the temperature of exothermic reactions wherein a flowing stream of mixed reactants passes through an elongated unitary reaction zone and wherein the rate of reaction diminishes as the reactants proceed in the reaction zone which comprises, passing a cooling medium in indirect heat exchange relation with the reactants and in a direction concurrent to the flow thereof, positively and progressively reducing the rate of heat removal from the reactants as they proceed through the reaction zone by progressively withdrawing cooling medium throughout the length of the reaction zone, the amount of cooling medium so withdrawn being controlled to prevent the temperature of the reaction mixture being reduced during its passage through the reaction zone.

2. A method of regenerating powdered catalytic material containing combustible deposits which comprises the suspending of said catalyst in a gaseous stream containing oxygen in an amount sufficient to burn said deposits, passing the resultant catalyst suspension through an elongated unitary regeneration zone maintained at a temperature sufficient to burn deposits, passing a cooling medium in indirect heat exchange relation with the catalyst suspension in the regeneration zone and in a direction concurrent to the flow of said suspension to remove heat liberated during said regeneration, positively and progressively reducing the rate of heat removal from the suspension as it proceeds through the regeneration zone and the rate of burning of the suspension decreases by progressively withdrawing cooling medium throughout the length of the regeneration zone, the amount of cooling medium so withdrawn being controlled to prevent the temperature of the suspension being reduced, its passage through the regeneration zone.

DONALD L. CAMPBELL.
JOHN M. GRAHAM.

REFERENCES CITED

The following references are of record in the file of this patent:

UNITED STATES PATENTS

| Number | Name | Date |
|---|---|---|
| 1,900,857 | Berry et al. | Mar. 7, 1933 |
| 2,046,816 | Fowler et al. | July 7, 1936 |
| 2,159,140 | Eckell et al. | May 23, 1939 |
| 2,163,599 | Houdry | June 27, 1939 |
| 2,227,416 | Payne | Dec. 31, 1940 |
| 2,248,196 | Plummer | July 8, 1941 |
| 2,260,152 | Nelly et al. | Oct. 21, 1941 |
| 2,276,307 | Houdry | Mar. 17, 1942 |
| 2,303,717 | Arveson | Dec. 1, 1942 |
| 2,320,273 | Gohr et al. | May 25, 1943 |
| 2,331,433 | Simpson et al. | Oct. 12, 1943 |
| 2,367,281 | Johnson | Jan. 16, 1945 |
| 2,374,660 | Belchetz et al. | May 1, 1945 |
| 2,409,596 | Simpson et al. | Oct. 15, 1946 |
| 2,412,917 | Simpson et al. | Dec. 17, 1946 |